Nov. 4, 1941.　　　G. A. V. TYSON　　　2,261,598
DEVICE FOR ESTABLISHING CONNECTION BETWEEN AIRCRAFT IN FLIGHT
Filed Aug. 4, 1939　　　10 Sheets-Sheet 1

Inventor:
Geoffrey Arthur Virley Tyson;
By his attorneys,
Baldwin & Wight

Nov. 4, 1941.　　　　G. A. V. TYSON　　　　2,261,598
DEVICE FOR ESTABLISHING CONNECTION BETWEEN AIRCRAFT IN FLIGHT
Filed Aug. 4, 1939　　　10 Sheets-Sheet 2
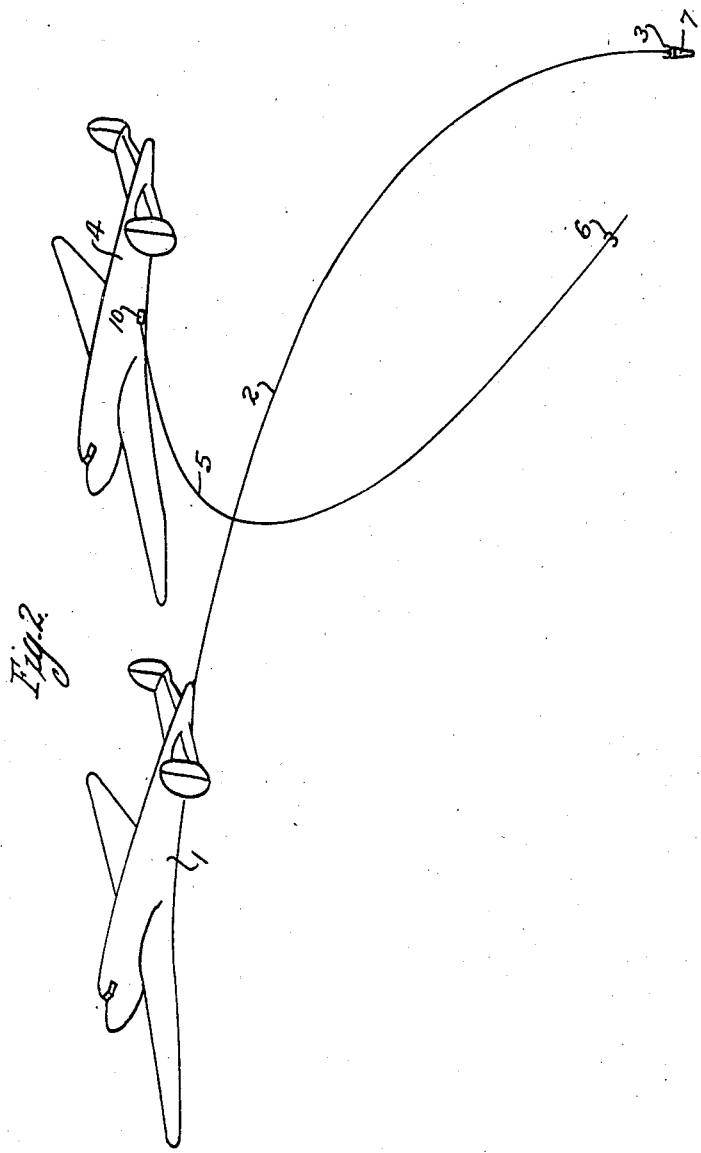
Inventor:
Geoffrey Arthur Virley Tyson,
By his attorneys,
Baldwin & Wight Nov. 4, 1941.   G. A. V. TYSON   2,261,598
DEVICE FOR ESTABLISHING CONNECTION BETWEEN AIRCRAFT IN FLIGHT
Filed Aug. 4, 1939   10 Sheets-Sheet 3
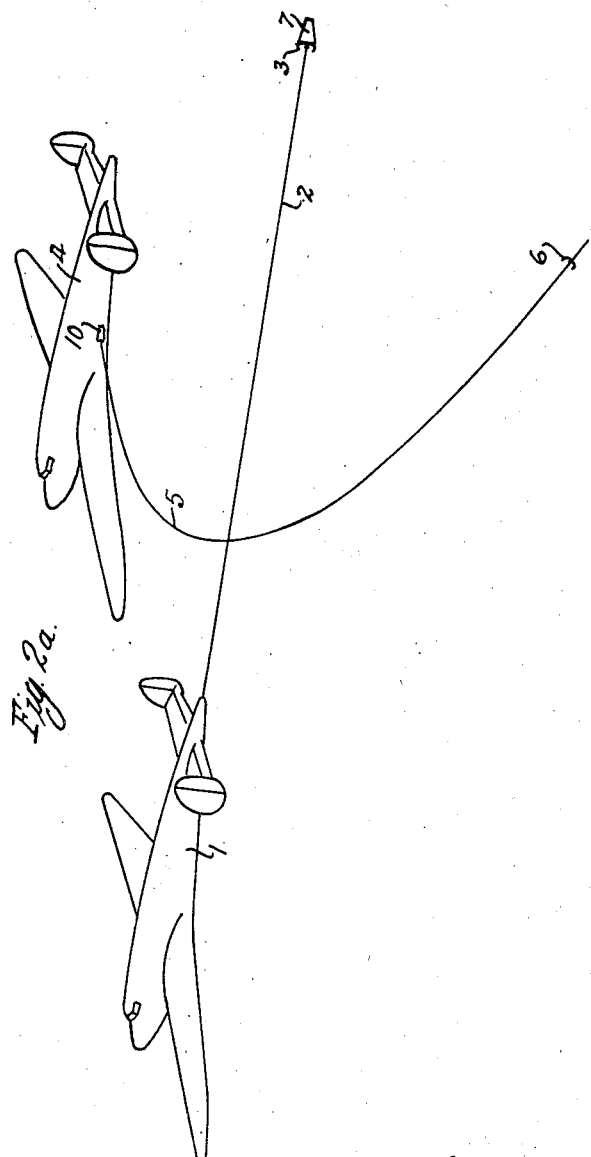

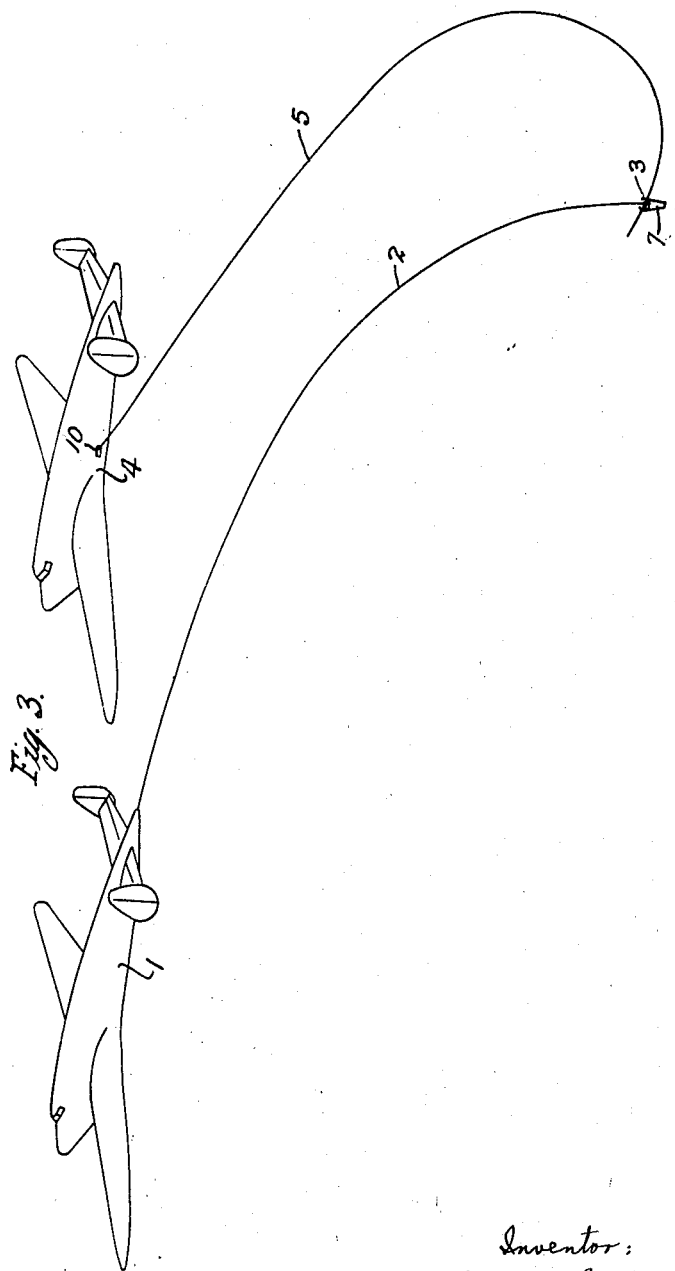

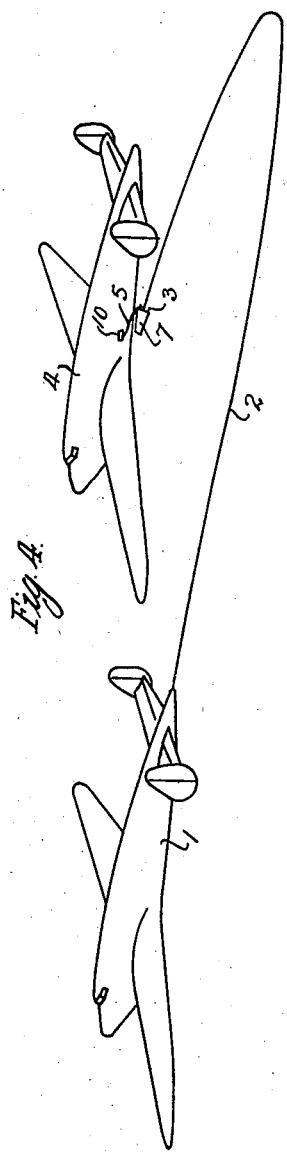

Nov. 4, 1941.                 G. A. V. TYSON                 2,261,598
   DEVICE FOR ESTABLISHING CONNECTION BETWEEN AIRCRAFT IN FLIGHT
                 Filed Aug. 4, 1939         10 Sheets-Sheet 6
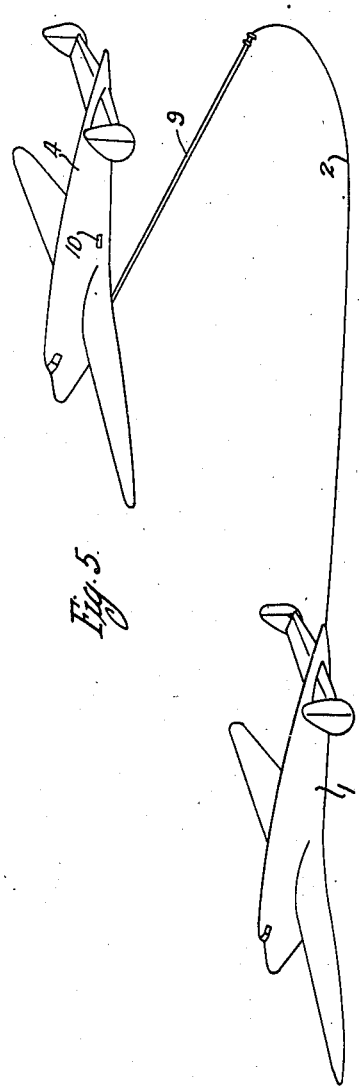
Inventor:
Geoffrey Arthur Virley Tyson;
By his attorneys,
Baldwin & Wight Nov. 4, 1941.　　　　G. A. V. TYSON　　　　2,261,598
DEVICE FOR ESTABLISHING CONNECTION BETWEEN AIRCRAFT IN FLIGHT
Filed Aug. 4, 1939　　　10 Sheets-Sheet 8
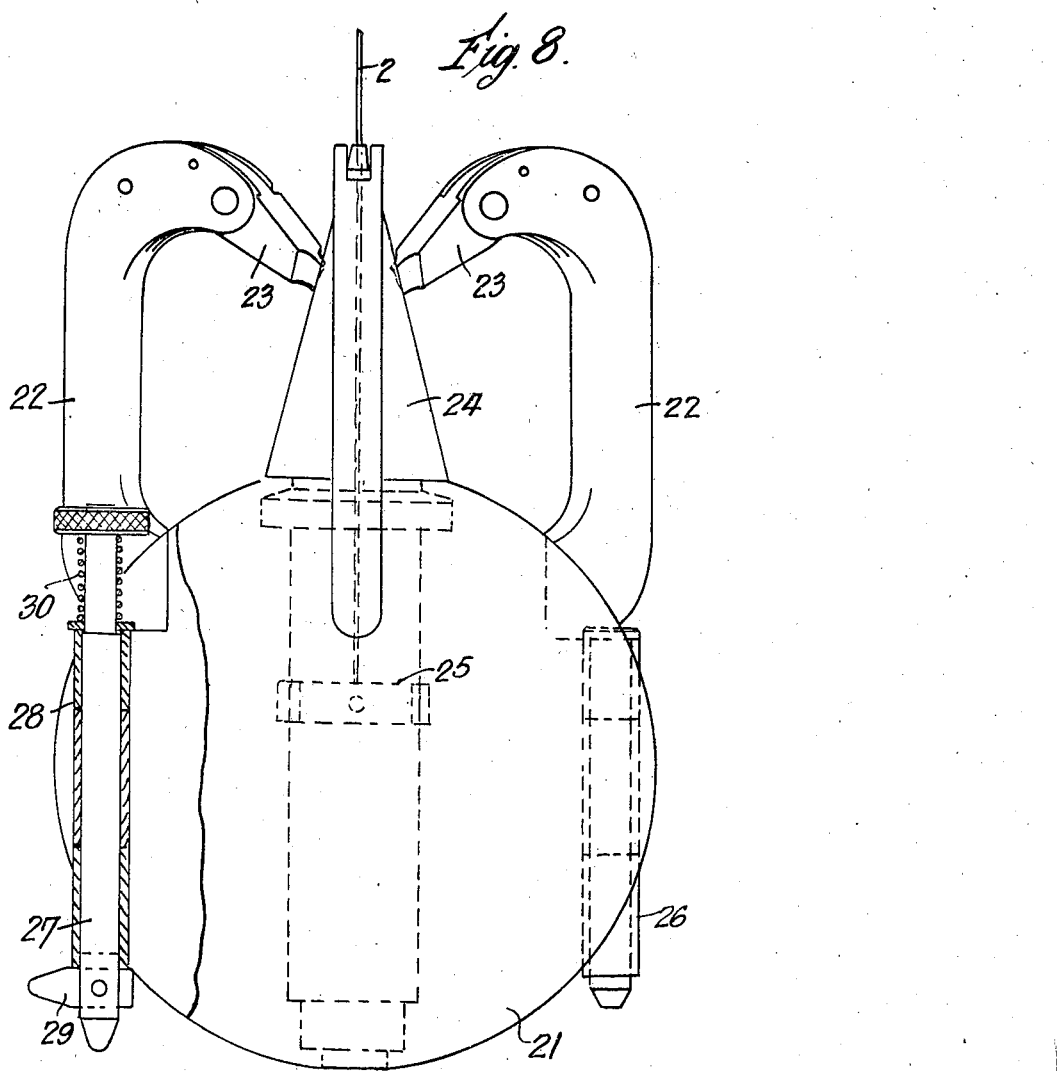
Inventor:
Geoffrey Arthur Virley Tyson;
By his attorneys,
Baldwin & Wight

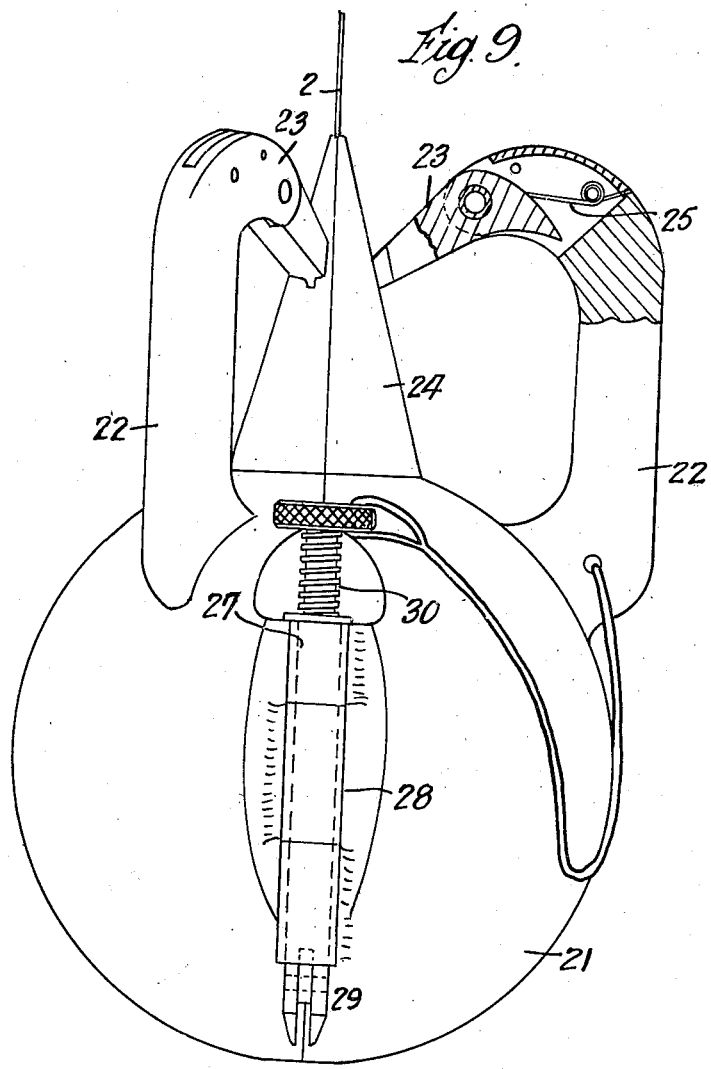

Nov. 4, 1941.   G. A. V. TYSON   2,261,598
DEVICE FOR ESTABLISHING CONNECTION BETWEEN AIRCRAFT IN FLIGHT
Filed Aug. 4, 1939   10 Sheets-Sheet 10
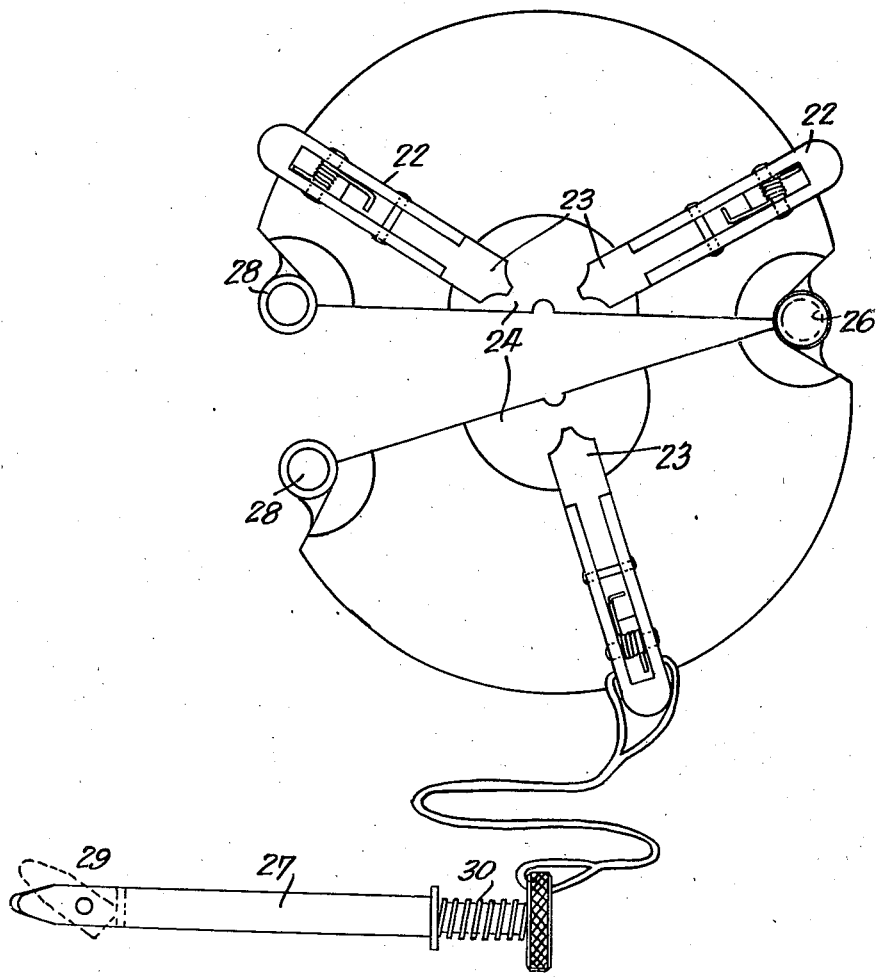

Patented Nov. 4, 1941

2,261,598

UNITED STATES PATENT OFFICE 2,261,598

DEVICE FOR ESTABLISHING CONNECTION BETWEEN AIRCRAFT IN FLIGHT

Geoffrey Arthur Virley Tyson, Yapton, England, assignor to Flight Refuelling Limited, Temple, London, England Application August 4, 1939, Serial No. 288,450
In Great Britain January 18, 1939

2 Claims. (Cl. 244—137)

This invention relates to improved means for establishing a cable or like connection between aircraft in flight as a preliminary step in the process of making transferences from one aircraft to another. It is to be understood that the expression "cable or like connection" is intended to include any kind of flexible line passing between the aircraft such as a cord, rope, wire, band, chain, tube or the equivalent. Hereinafter the word "cable" will be used simpliciter to denote such means of connection.

By means of the establishment of cable connection between aircraft it is rendered possible to provide means for transferring, for instance, fuel, goods of various kinds, and living beings, as well as less concrete things such as power. It will be understood that the cable connection initially established may serve as a means of establishing a different form of cable connection as, for instance when in refuelling aircraft in flight an ordinary line connection is first made and this is used to pull out a hose between the aircraft.

The method of establishing a cable connection between aircraft in flight, according to the invention, comprises projecting a cable from one aircraft, whilst retaining an end of the cable on the aircraft, in such a way as to engage a cable trailing behind or suspended from a second aircraft and causing the cables to connect with one another by providing mutually engaging means on the respective cables.

This method of establishing a cable connection may be used, and preferably is so used, in such a way that the aircraft involved, may be flying on more or less parallel courses, the aircraft which projects the cable not crossing the path of the other aircraft.

When the cable connection is being employed as a preliminary to refuelling aircraft in flight, the cable is projected from the tanker aircraft, and after it has interengaged the trailing or hanging cable, the projected cable is preferably drawn back into the tanker aircraft by means of a windlass or the like, so that a hose may be attached to the trailing cable. The receiver aircraft may then draw in that cable and bring the hose along with it.

The apparatus for establishing the cable connection comprises in combination on one aircraft a weighted cable and means for projecting the weighted end of that cable laterally of the aircraft, or at an angle to the line of flight thereof, whilst retaining the other end of the cable on the aircraft. A plurality of such apparatus may be provided.

Preferably the cable is retained by being connected at one end to a windlass or like apparatus for hauling in or paying out the cable, which apparatus may be suitably located in the aircraft adjacent the refuelling hose.

The cable is preferably a light line which may be weighted by means of a projectile releasably mounted on any part of the aircraft convenient for the projectile to be propelled substantially laterally from the aircraft.

The projectile and cable may be shot from a gun of the normal line throwing type compressed air or by springs, or it may be in the form of a rocket carrying its own projecting force. It may also be propelled by a combination of these means.

In order to achieve interengagement of the cables, a grapnel or hook may be provided on one or other cable, the other cable carrying a suitable object to be caught by the grapnel or hook.

The invention is illustrated in the accompanying drawings in which—

Figures 1 to 5 are diagrammatic views showing one method of making contact and

Figure 2a is a diagrammatic view showing another method.

Figures 8–10 show three views of a preferred form of weighted grapnel.

Figure 1:
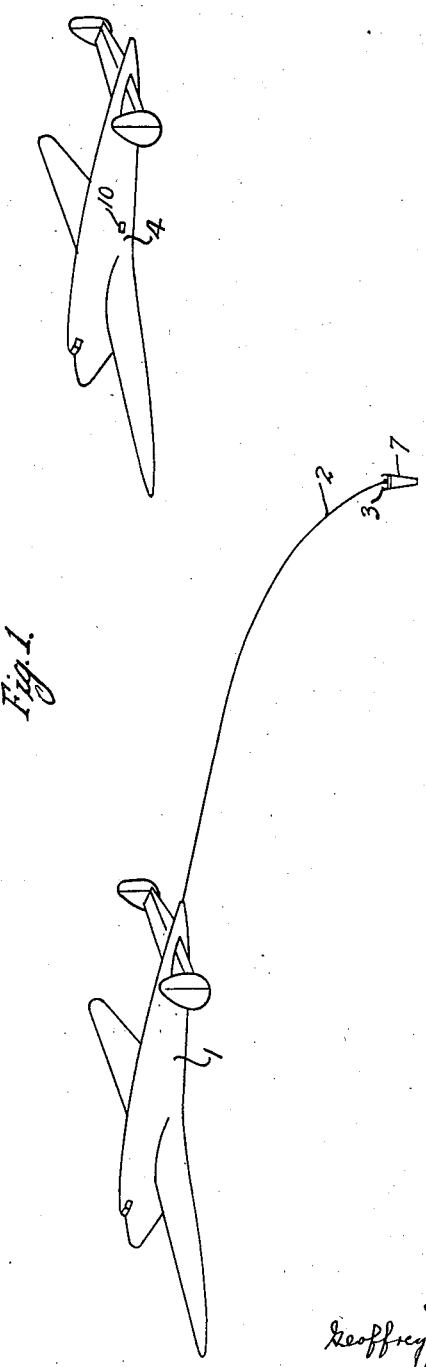

Referring to the diagrammatic drawings, there is shown in Figure 1 a liner aircraft 1 from the tail of which is trailed a cable 2 at the outer end of which is provided a weighted grapnel generally indicated at 3. The tanker aircraft 4 which is to refuel the aircraft 1 flies up behind the "liner" travelling in the same general direction and taking up a position slightly below and behind the aircraft 1 as shown.

When in this position the aircraft 4 ejects a cable 5 (Figure 2) so that it passes across and under the cable 2 as indicated. Almost immediately, however, the cable 5 will be subjected to air drag and will fall back into and across the cable 2 as indicated in Figure 3. In doing so a stop 6—on the cable 5—which may be in the form of a grapnel or weighted projectile, engages with the grapnel 3 on the end of the cable 2.

In the form shown in Figure 2a the cable 2 is caused to trail substantially horizontally by means of the drogue 7 attached thereto. The grapnel 3 is still employed. In this case the tanker 4 takes up a position slightly behind and above the aircraft 1, ejecting its cable 5 across and above the cable 2. Wind pressure takes the cable 5 back along the cable 2 until the grapnel 3 and stop 6 engage.

Thereafter, when contact has been made in either of the above ways for the purpose of refuelling, the cable 5 is wound back into the aircraft 4, as indicated in Figure 4, taking with it the grapnel end 3 of the cable 2.

When the grapnel end 3 has been brought up into the aircraft 4 a fuel hose 9 (see Figure 5) is secured to the cable 2 and the cable and hose wound down into the liner aircraft 1, so that when the hose has been properly coupled up to the fuel tanks of that aircraft, fuel may be passed from the aircraft 4 to the aircraft 1.

It will be noted that in the methods of making contact in accordance with this invention the minimum manoeuvring of the aircraft is entailed, the aircraft both flying in the same general direction throughout, as distinct from other known procedures in which one aircraft has to fly across the path of another to intercept the trailing cable. Furthermore the cable trailed by the liner aircraft need never be brought into proximity with any parts of the "tanker" aircraft which might be damaged thereby—e. g. propellers.

Figure 6:
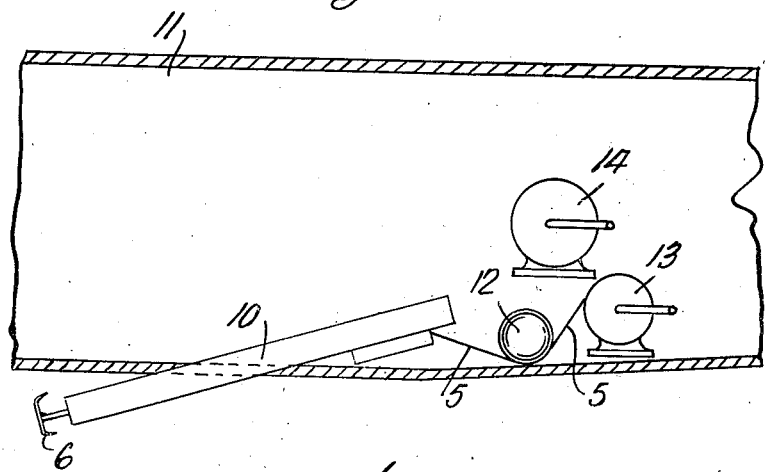
Figure 6 is a sectional view showing one form of ejecting means and associated cable and windlass.

The ejecting means as indicated may be of various types and located at any suitable position on the aircraft. In Figure 6 the ejector is in the form of a line throwing gun 10 such as normally employed by coast-guards, lifeboats and the like. The gun 10 is mounted in the fuselage 11 of the aircraft 4 behind and below the wings, so that the cable 5 shall not foul the wings when projected.

The gun 10 ejects a grapnel 6 the stem of which extends into the gun barrel and has secured thereto an end of the cable 5, of which a coil 12 is provided between the gun and windlass 13 which controls the winding up of the cable and serves to retain one end of the cable within the aircraft 4. Adjacent the windlass 13 is a drum 14 on which is wound the fuel hose 9.

Figure 7:
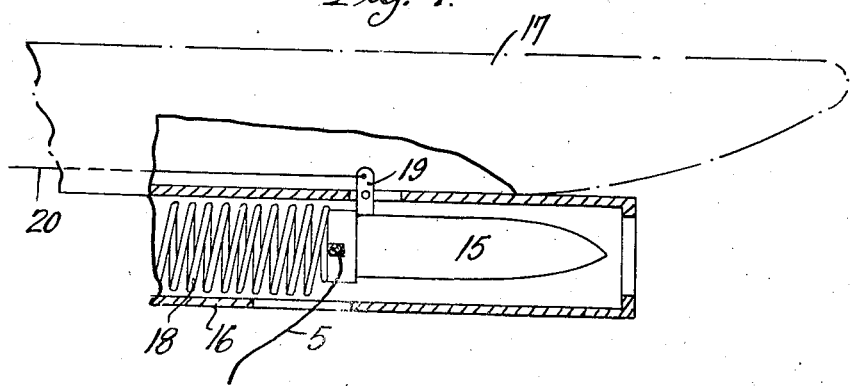
Figure 7 is a sectional view showing another form of ejecting means.

Another ejector means is shown in Figure 7 in which a projectile 15 is supported within a housing 16 below a wing 17 of the aircraft 4. The projectile has secured thereto one end of the cable 5 which passes back to the windlass in the fuselage as indicated above. The projectile is adapted to be ejected by the spring 18, but is normally retained by a catch 19 operated through a Bowden wire control 20 from within the aircraft.

It will be appreciated that the cable in its projected flight will be subjected to air drag and gravity and it is therefore necessary to set the ejecting means at a suitable inclination to the axis of the aircraft so as to ensure that the cable 5 will engage the trailing cable 2.

The preferred form of weighted grapnel adapted for attachment to the cable 2 is shown in Figures 8–10 wherein Figure 9 is an elevation of the grapnel taken at right angles to the elevation shown in Figure 8, and Figure 10 is a plan of the opened grapnel.

The grapnel consists of a hollow weighted body 21 from which extend the grapnel claws 22. These claws have pivoted tips 23 which abut, against a conical or tapered guide member 24 located between the claws 22. The tips 23 are biased into contact with the member 24 by springs 25 of which one is shown in Figure 9.

The member 24 is formed with a central passage through which passes the end of the cable 2. The cable 2 is secured to one component 25 of a coupling, e. g. a bayonet coupling accommodated or housed within the body 21 and adapted to enable the cable 2 to be readily secured to the fuel hose 9, the end of which is provided with the other component of the bayonet coupling.

To enable the component 25 to be extracted from the body 21, the latter is split on its vertical centre line, the two halves hinging about the pin 26. The body is normally held closed by a pin 27 which extends through tubular extensions 28 formed on the halves of the body. The pin 27 has a lower end 29 which can be rocked to lock the pin in position, the pin being biased upwardly by the spring 30.

In operation the grapnel is secured to the cable 2 by enclosing the component 25 and end of the cable 2 in the body 21 and member 24. When the cable is trailed the claws 22 will be directed towards the aircraft 1 so that as the cable 5 slides along the cable 2, the cables will automatically contact with the claws 22 being guided by the member 24, press open the tips 23 and be held within the grapnel by the subsequent automatic closing of the tips 23 on to the member 24.

When the grapnel has been drawn up into the aircraft 4, an operator will withdraw the pin 27, open the grapnel and extract the coupling component 25, which he will then secure to the fuel hose 9.

It will be appreciated that other ways may be used to construct the body 21 as will be within the skill of an instructed person and within the scope of this invention. Thus the upper portion of the body could hinge about a horizontal pivot, the claws themselves may be pivoted to allow the body to open.

What I claim is:

1. The combination on an aircraft having a wing and a fuselage of a cable, a weighted member on the cable, means mounted underneath said wing for ejecting the weighted member and a length of said cable away from the aircraft, means within the fuselage for drawing back into the aircraft the projected length of the cable, and means for entraining the ejected cable to said cable-drawing means.

2. The combination on an aircraft having a wing and a fuselage, of a cable having a weighted end, means mounted underneath said wing for ejecting a length of the weighted end of the cable away from the aircraft, a paying out and hauling in apparatus to which the other end of the cable is connected, and means for entraining the ejected cable to said cable-drawing means.

GEOFFREY ARTHUR VIRLEY TYSON.